United States Patent

[11] 3,626,409

[72] Inventors Raymond Monroe Hill; Leland Duane Lewis, both of Raleigh, N.C.

[21] Appl. No. 89,205
[22] Filed Nov. 13, 1970
[45] Patented Dec. 7, 1971

[73] Assignee International Business Machines Corporation Armonk, N.Y.

[54] KEYBOARD DATA ENTRY DEVICE
8 Claims, 5 Drawing Figs.

[52] U.S. Cl. .......... 340/365, 179/90 K, 178/17 R, 178/17 C, 235/145, 178/79
[51] Int. Cl. .......... G08c 1/00
[50] Field of Search .......... 340/365, 345; 179/90 K; 178/17 R, 17 C, 17.5, 79, 81; 235/145, 146; 200/5 R, 5 E; 250/221

[56] References Cited
UNITED STATES PATENTS
3,461,454 8/1969 Steckenrider .......... 343/112

*Primary Examiner*—Donald J. Yusko
*Assistant Examiner*—Robert J. Mooney
*Attorneys*—Hanifin and Jancin and John B. Frisone

ABSTRACT: Each of the keys in a multiple key keyboard has associated with it a source of radiofrequency (RF) electromagnetic energy which is activated when the key is depressed. The radiated energy from each key is directed to a unique location of a wire detecting matrix which in conjunction with connected differential sense amplifiers provides a unique output for each activated RF source.

INVENTORS
RAY M. HILL
LELAND D. LEWIS

BY John B. Trisone
ATTORNEY

FIG. 3
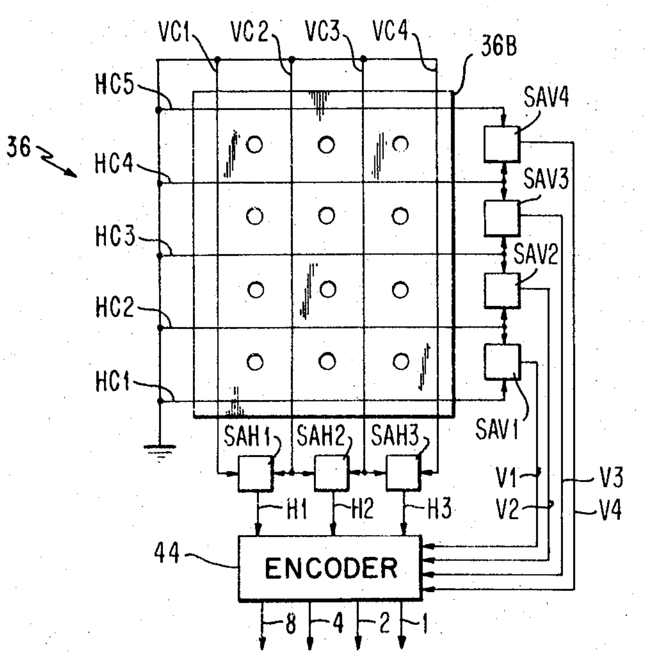
FIG. 4
| HORIZ | VERT | CHAR | OUTPUT CODE |
|---|---|---|---|
| SAH1 | SAV4 | 0 | 1111 |
| SAH2 | SAV4 | 1 | 0001 |
| SAH3 | SAV4 | 2 | 0010 |
| SAH1 | SAV3 | 3 | 0011 |
| SAH2 | SAV3 | 4 | 0100 |
| SAH3 | SAV3 | 5 | 0101 |
| SAH1 | SAV2 | 6 | 0110 |
| SAH2 | SAV2 | 7 | 0111 |
| SAH3 | SAV2 | 8 | 1000 |
| SAH1 | SAV1 | 9 | 1001 |
| SAH2 | SAV1 | + | 1010 |
| SAH3 | SAV1 | - | 1011 |
FIG. 5
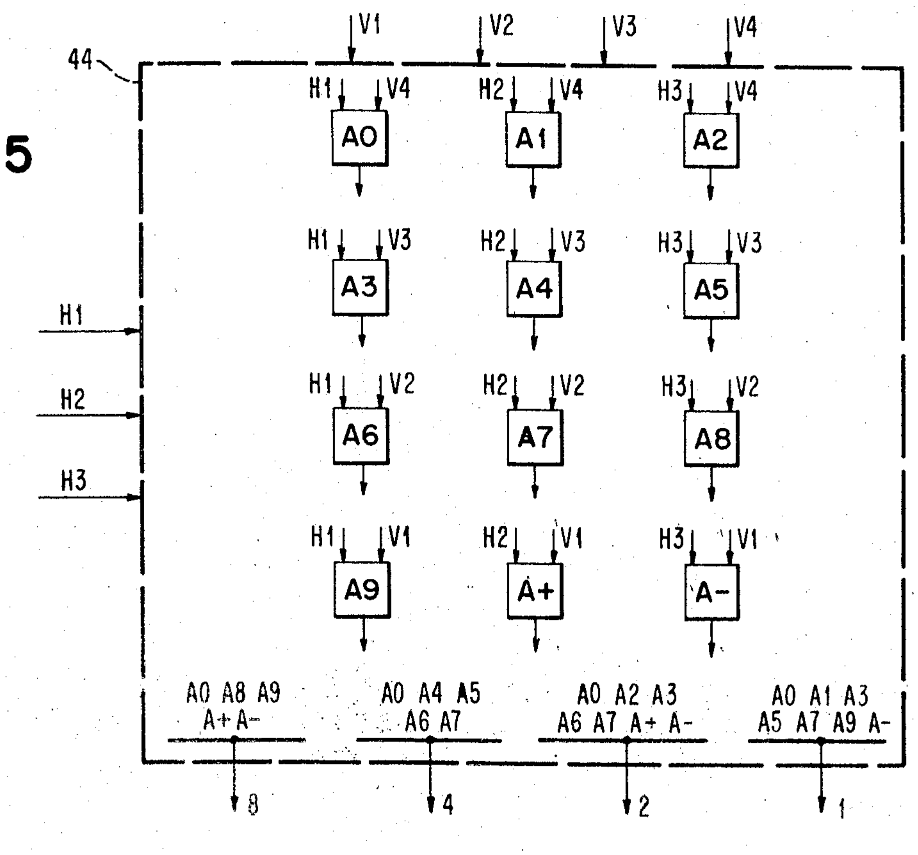

KEYBOARD DATA ENTRY DEVICE

BACKGROUND OF The Invention

The invention relates to keyboard data entry devices in general and more particularly to keyboard entry devices utilizing a positionally unique radiated RF field for identifying each of the keys of the keyboard.

DESCRIPTION OF THE PRIOR ART

The prior art in the keyboard area is extensive and an exhaustive review would serve no useful purpose. Generally in response to a key depression, a physical or electrical manifestation in response thereto is detected and encoded to identify the depressed key. A large number of keyboards utilize one or more unique switch closures associated with each of the keys and electronic or electromechanical means for detecting and encoding specific key closures.

An electromagnetic radiation detecting matrix disclosed in U.S. Pat. No. 3,461,454 to R. N. Steckenrider is utilized in this invention in conjunction with a plurality of keys each including a unique source of electromagnetic energy which is activated when a key is depressed. The energy from each of the keys, when activated, is directed to a unique area of the detecting matrix which provides outputs identifying the activated source. These outputs are encoded in binary form and may be utilized for any appropriate purpose.

SUMMARY OF THE INVENTION

The invention contemplates a keyboard device for entering data suitable for use in data processors and includes a plurality of keys supported in a fixed spacial relationship, each of said keys including means for radiating a restricted electromagnetic field when the key is actuated and an electromagnetic radiation detecting matrix positioned proximate said keys and cooperating with a said depressed key for providing unique outputs indicative of said key depression.

BRIEF DESCRIPTION OF THE DRAWINGS

FIG. 3 is a schematic diagram of an electromagnetic radiation matrix detector;

FIG. 4 is a table defining the operational characteristics of the circuit of FIG. 3; and FIG. 5 is a schematic block diagram of an encoder suitable for use in the circuit of FIG. 3.

DESCRIPTION OF THE PREFERRED EMBODIMENT

Figure 1:
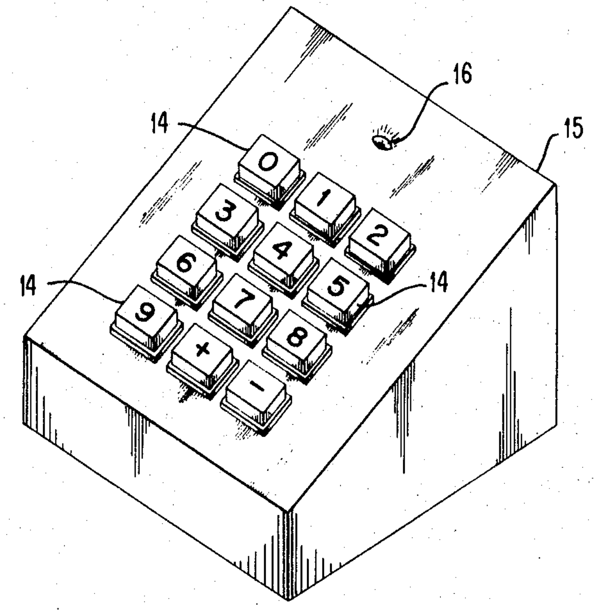
FIG. 1 is a perspective view of a key entry device constructed in accordance with the invention.

The keyboard as illustrated in FIG. 1 includes a plurality of indicia bearing keys 14, each of which is provided with a unique indicia identifying the significance of the key. In the illustrated embodiment, 12 keys bearing indicia 0–9, + and − are provided. The number of keys is essentially unlimited by the nature of the device and is only limited by the complexity an operator performing a given data input function can cope with and the total cost that the performance of any given operation can support. A cover 15 having an opening for each key encases the entire structure. The keys 14 protrude through the openings in cover 15 and are in part supported and restricted in their movement by the cover 15. An indicator lamp 16 is supported on the cover and provides a visible indicia whenever a key entry has been made.

Figure 2:
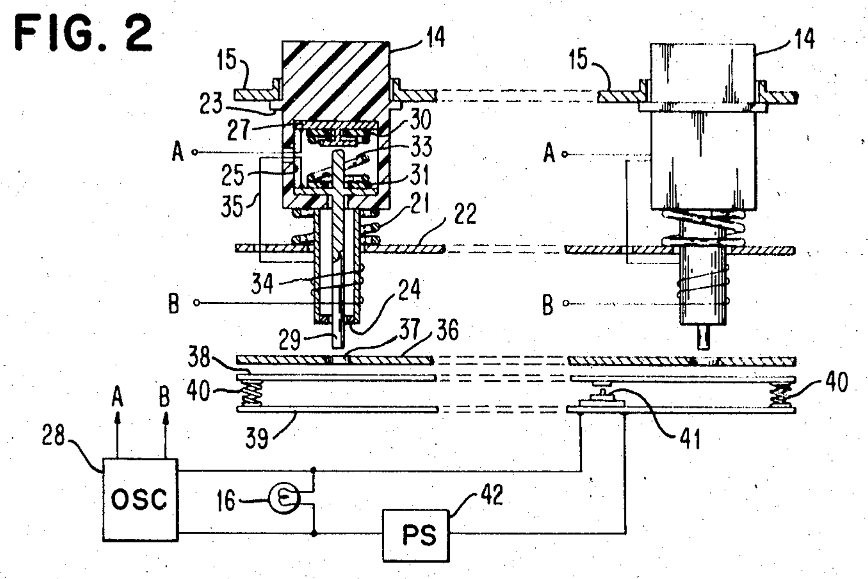
FIG. 2 is a cross-sectional view of the keys and essential support structure.

The keys 14, as seen in FIG. 2, are held in a fixed spacial position by the cover 15, a spring 21 and a support member 22. The spring 21 in cooperation with support member 22 exerts a force on the main body of key 14 urging it upwardly and through the opening in cover 15. An annular flange 23 on the main body of key 14 restricts the upward movement of key member 14 and retains it in a stable orientation. A lower body portion 24 of key 14 extends downwardly through an opening in support 22 in alignment with the opening in cover 15 to provide lateral stability of the key with respect to cover 15 and support 22.

A chamber 25 within the key 14 includes a conductive element 27 connected via conductor A to an oscillator 28, another conductive element 29, a pair of insulating members 30 and 31 in abutting relationship with conductive elements 27 and 29 respectively and a spring 33 bearing against insulating members 30 and 31 which maintains conductive elements 27 and 29 separated when the key is in its normal position under the influence of spring 21. A coil 34 wound on the outside of the lower portion 24 of key 14 has one end connected to conductive element 29 by a conductor 35 and its other end to oscillator 28 by conductor B.

Positioned below the support 22 and keys 14 is a matrix detector 36, only part of which is illustrated. The detector is provided with an opening 37 in alignment with each of the keys. An actuator plate 38 is supported on a base plate 39 by springs 40. A switch 41 mounted on base plate 39 connects a power supply 42 to oscillator 28 and lamp 16 whenever actuator plate 38 is downwardly deflected.

When a key is depressed, spring 21 compresses allowing the key structure to move downwardly. Element 29 passes through opening 37 and engages actuator plate 38. At this time, further downward movement of the key compresses spring 33 permitting elements 27 and 29 to contact each other. Continued movement of the key compresses springs 40 allowing actuator plate 38 to close switch 41. At this time, oscillator 28 is energized and RF energy is radiated by coil 34 which is positioned in close proximity to detector matrix 36. The energy passes from oscillator 28 via conductor A, elements 27 and 29, and conductor 35 to coil 34 while conductor B provides a return path from the coil 34. Detecting matrix 36 detects the energy radiated by coil 34 and provides an output indicative of which key has been actuated. The operation of matrix 36 will be explained in detail later. When the key is released, switch 41 opens and removes the power from oscillator 28 and lamp 16. The springs 21, 33 and 40 restore the device to the illustrated condition and another entry is possible.

Detecting matrix 36 illustrated in detail in FIG. 3 includes a printed circuit board 36B having a first group of spaced parallel horizontal conductors HCl–HC5 printed on one side and a second group of spaced parallel vertical conductors VC1–VC4 printed on the other side. One end of each of the conductors is connected to ground. The other ends are connected as illustrated to horizontal differential sense amplifiers SAH1–SAH3 and to vertical differential sense amplifiers SAV1–SAV4. The outputs of the sense amplifiers are connected to an encoder 44.

When a key 14 is depressed, the coil 34 associated therewith is displaced into close proximity with board 36B and the oscillator 28 energizes the displaced coil. The radiated RF energy is restricted by the placement and shape of coil 34 and induces out-of-phase currents in the horizontal and vertical conductors on opposite sides of the coil. Only one horizontal and one vertical sense amplifier, that is the sense amplifier connected to the immediately adjacent horizontal and vertical wires, respectively, will receive out-of-phase components and thus provide a valid output.

For example, if the key labeled 7 is depressed, the currents induced in VC2 and VC3 are out of phase and applied to differential sense amplifier SAH2 which provides an output. The currents induced in wire pair VC1 and VC2 are in phase with each other while the currents induced in wire pair VC3 and VC4 are of opposite phase; however, they are in phase with each other. Differential sense amplifiers SAH1 and SAH3 will not provide outputs since the currents applied to the amplifiers are in phase. Detection in the other direction is identical. FIG. 4 tabulates the operational characteristics of the matrix 36.

The details of encoder 44 are illustrated in FIG. 5. An AND gate circuit is provided for each key. These are designated A0–A9, A+ and A– for the keys 0–9, + and –, respectively in the keyboard. Outputs H1–H3 and V1–V4 of differential sense amplifiers SAH1–SAH3 and SAV1–SAV4 respectively, are connected as indicated in the drawing and the outputs of the AND circuits are dot ORed as indicated to provide the outputs tabulated in FIG. 4. If desired, encoder 44 could be replaced by a sequential scanner for sequentially scanning outputs H1–H3 and V1–V4. The scanned outputs could be transmitted serially to a computer or other utilization device and encoded there at a later time.

While the invention has been particularly shown and described with reference to a preferred embodiment thereof, it will be understood by those skilled in the art that various changes in form and details may be made therein without departing from the spirit and scope of the invention.

What is claimed is:

1. A data entry keyboard suitable for use with data processing devices comprising:
 a plurality of keys supported in a relatively fixed spacial relationship,
 each of said keys including means for radiating an electromagnetic field whenever the key is actuated, and
 an electromagnetic radiation detecting means positioned proximate said keys and responsive to the radiation emanating from the said actuated key for providing unique outputs identifying the said depressed key.

2. A data entry keyboard as set forth in claim 1 in which said keys and said electromagnetic radiation detecting means are complementary and the detecting means include a unique pair of detecting elements in physical alignment with each of said keys.

3. A data entry keyboard as set forth in claim 2 in which the keys and the electromagnetic detecting means are arranged in a complementary rectangular matrix.

4. A data entry keyboard suitable for use with a data processing device comprising:
 a plurality of keys supported in a relatively fixed spacial relationship with freedom to move in one direction only from a first stable position to a second actuated position,
 means coacting with a said key when it is in the said second actuated position for supplying a high frequency current,
 each of said keys including means for radiating a restricted high frequency electromagnetic field, and a normally open switch means which is closed when the key is moved from the said first position to the said second position for establishing a connection between the said radiating means and the supply of high frequency current, and
 an electromagnetic radiation detection means positioned proximate said keys and coacting with the high frequency electromagnetic radiation from a said actuated key for providing unique outputs identifying the said actuated key.

5. A data entry keyboard as set forth in claim 4 in which the means for radiating a restricted high-frequency electromagnetic field is a coil carried by a stem on the key and said coil is provided with a first termination connected to the high-frequency current supply and a second terminal connected to said normally open switch means.

6. A data entry keyboard as set forth in claim 5 in which the switch means included in the key are located within the key and comprises:
 a relatively fixed electrode connected to the high-frequency current supply,
 a moveable electrode connected to the said second terminal of the coil, and
 compressible means urging said fixed and moveable electrodes out of contact with each other and yielding under an actuating force to permit contact.

7. A data entry keyboard as set forth in claim 4 in which said electromagnetic radiation detection means comprises:
 a first group of spaced substantially parallel conductors,
 a second group of spaced substantially parallel conductors arranged to intersect said first group and electrically insulated therefrom at the points of intersection,
 first group of differential sense amplifiers each connected to adjacent spaced conductors in said first group of conductors for providing an output whenever the current induced in the connected conductors in response to a key actuation are out of phase with each other,
 a second group of differential sense amplifiers each connected to adjacent spaced conductors in said second group of conductors for providing an output whenever the currents induced in the connected conductors in response to a key actuation are out of phase with each other.

8. A data entry keyboard as set forth in claim 7 further including:
 means responsive to said first and second groups of differential sense amplifiers for encoding the unique combinations of outputs of said first and second group of differential sense amplifiers.

* * * * *